Jan. 12, 1937.   P. L'ORANGE   2,067,274
INTERNAL COMBUSTION ENGINE
Filed June 15, 1934    5 Sheets-Sheet 1
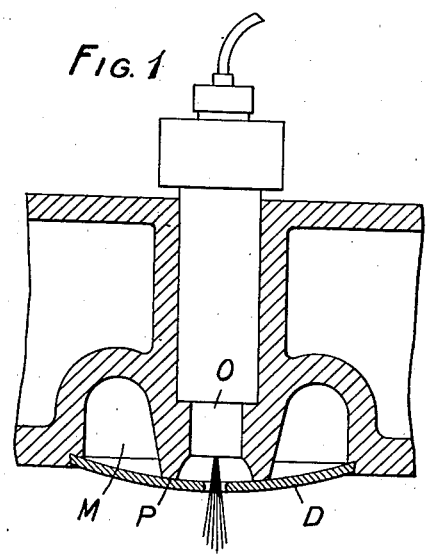
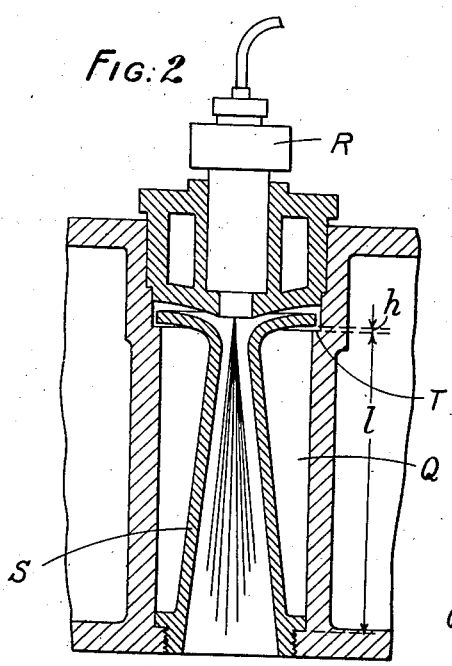
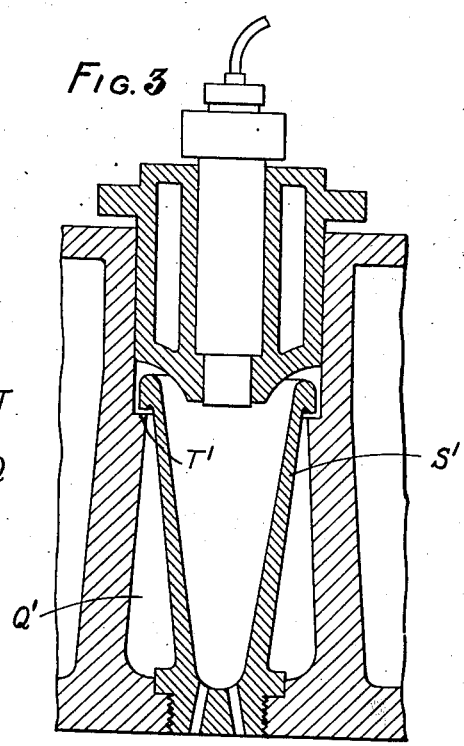

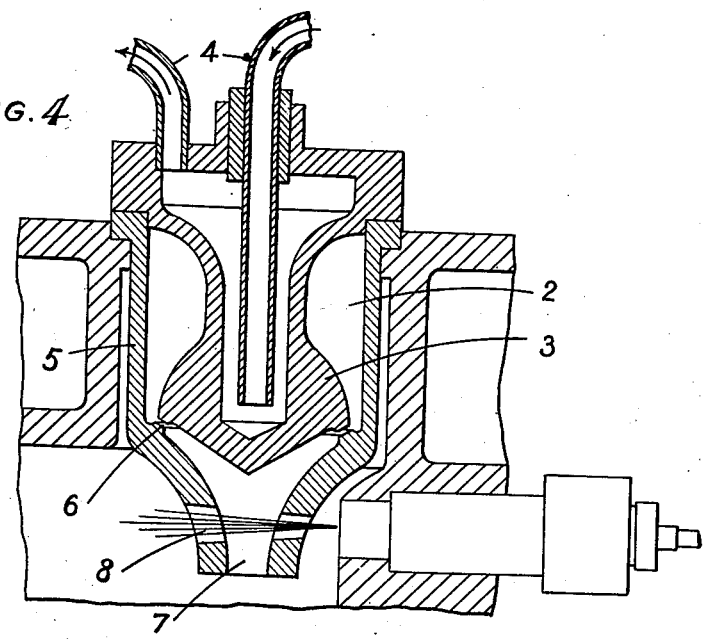
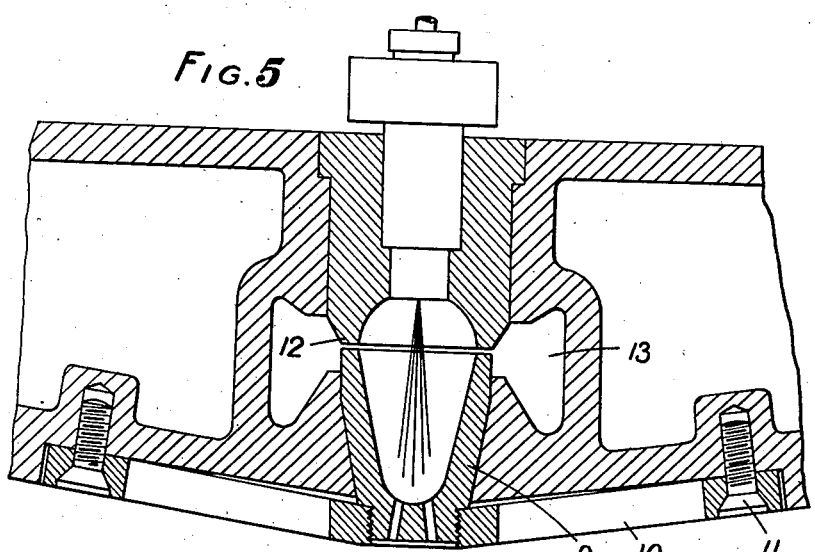
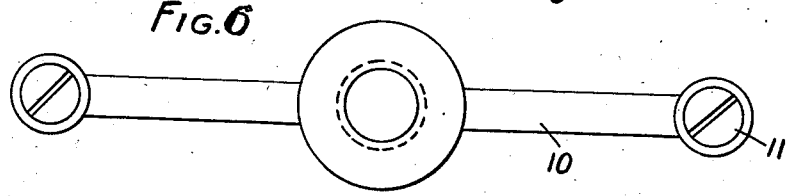

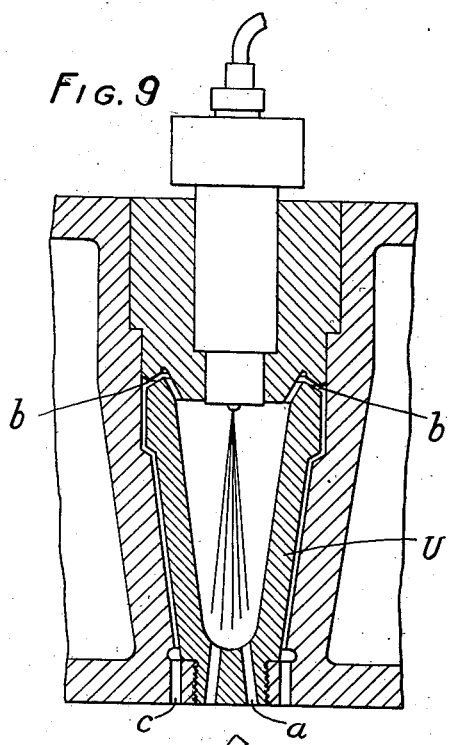
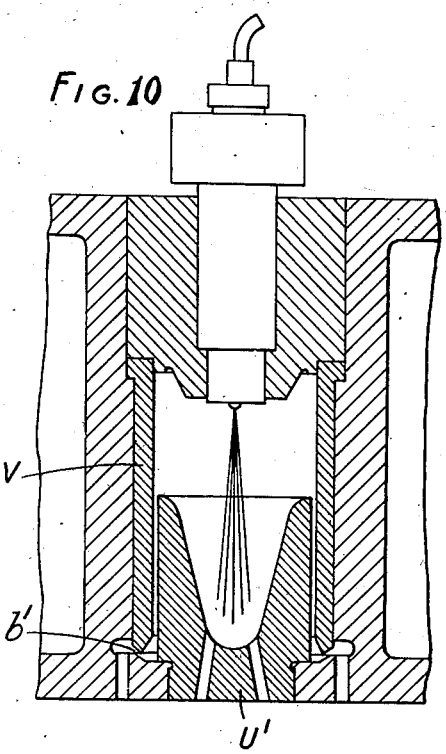
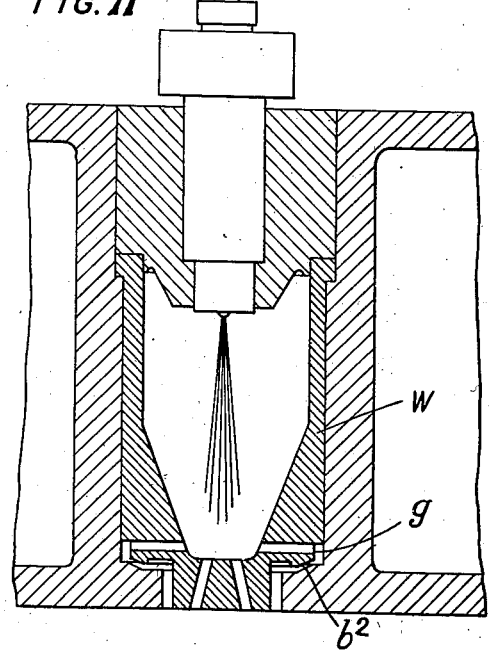

Patented Jan. 12, 1937

2,067,274

UNITED STATES PATENT OFFICE 2,067,274

INTERNAL-COMBUSTION ENGINE

Prosper L'Orange, Feuerbach-Stuttgart, Germany

Application June 15, 1934, Serial No. 730,691
In Germany June 17, 1933

5 Claims. (Cl. 123—33)

This invention relates to an internal-combustion engine of the kind working with compression ignition and wherein the cylinder head is provided with an additional clearance space by the automatic control of which the compression ratio can be varied, the object being to facilitate the starting of the engine by effecting the ignition of the fuel mixture under a compression which is greater than that prevailing when the engine is running.

The invention is applied to engines wherein the additional clearance space or spaces communicate with the principal cylinder space or with one another through a narrow passage or passages, and consists in providing the cylinder head with a shell which confines the passage or passages and which is adapted, by thermal expansion and contraction to close and regulate the passages.

The arrangement may be such that the clearance space in the cylinder head is kept in communication with the cylinder space while the engine is warm for obtaining normal compression, and closed when the engine is cold so as to restrict the cylinder volume and produce increased pressure for starting. As an alternative the space in the cylinder head may be used as a pre-ignition chamber, in which case its communication with the cylinder space may be restricted by the shell when the engine is warm, for producing normal compression in the chamber, and extended when the engine is cold so that then the compression in the cylinder space will be more readily communicated to the pre-ignition chamber for facilitating the starting of the engine.

Figure 7:
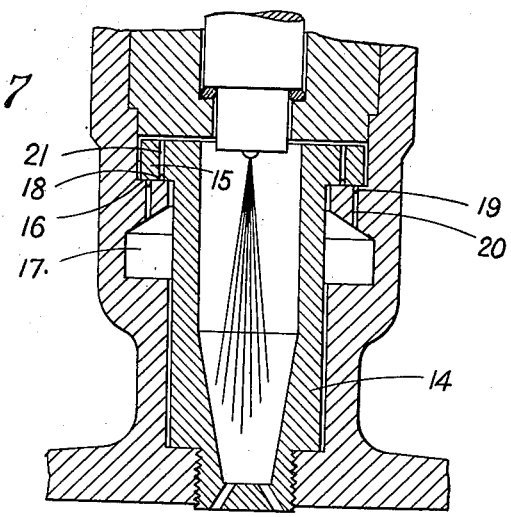
Figure 8:
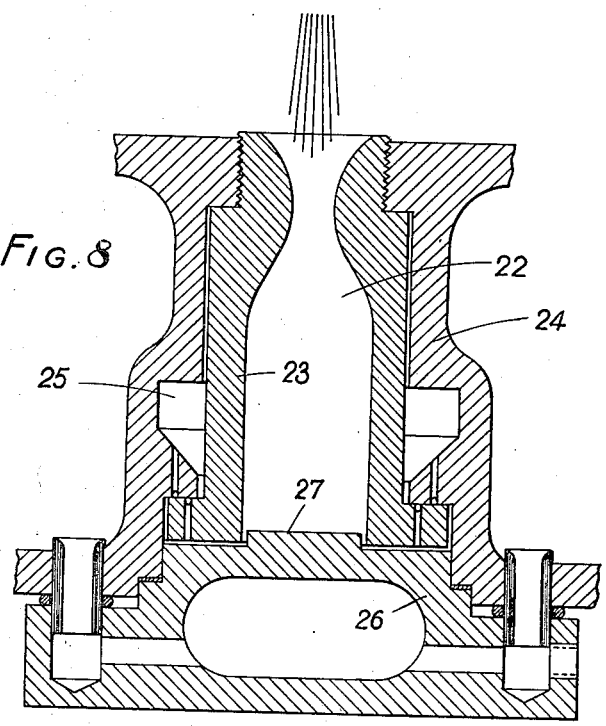
Figure 12:
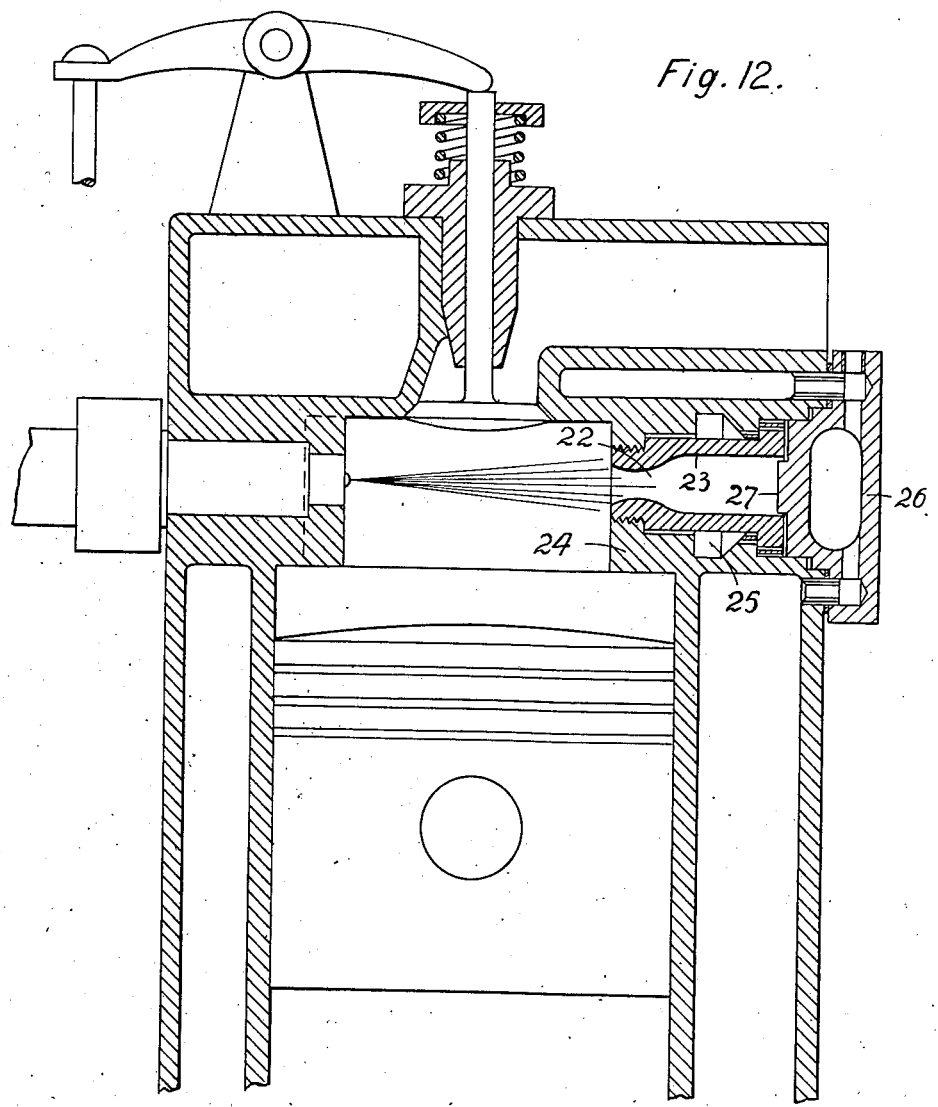

Fig. 1 of the accompanying drawings represents a sectional view of a device constructed according to the invention, Fig. 2 is a sectional view of a modification, Figs. 3 to 5 are sectional views of further, different modifications, Fig. 6 is a detail view of Fig. 5, Figs. 7 to 11 are sectional views of still further modifications, and Fig. 12 is a sectional view showing the location of the device according to Fig. 8 in the cylinder head.

Fig. 1 shows a very simple construction of the device. In this construction the cylinder head is formed with an additional clearance space in the form of an annular channel M which surrounds the fuel nozzle O. A slightly dished shell D covers the channel and co-operates with a valve seat P for normally closing the channel. The compression in the cylinder is then above the normal so that the starting of the engine by compression-ignition will be facilitated. A central aperture in the shell through which the fuel jet enters the cylinder, also serves as means of communication between the channel M and the cylinder. On the engine being heated, the shell D expands and will in so doing be retracted from the valve seat P, the edges of the shell being firmly supported. The space M will then be in communication with the principal cylinder space through the aperture in the shell, and the compression will be normalized.

Fig. 2 shows an arrangement wherein the cylinder head is formed with a cylindrical passage Q the outer end of which is closed by a cooled fuel jet nozzle R. The passage contains a conical shell S the wide end of which is secured to the cylinder head at the inner end of the passage Q. The narrow end of the shell approaches the jet orifice and is formed with a flange which normally bears against a shoulder T in the passage, thereby closing the portion of the passage which surrounds the shell. The jet passes through the shell into the cylinder. On the engine being heated the shell expands, and the flange then leaves the shoulder T so that the space surrounding the shell S will be added to the compression space for normalizing the latter. At a temperature of 400° C., the width $h$ of the slit between the flange and the shoulder T will, if the shell be made of ingot iron, amount to about 0.5% of the length $l$ of the shell S.

Fig. 3 shows a similar arrangement but wherein a conical shell S' is secured with its narrow end to the cylinder head at the inner end of the passage Q'. In this case the shell itself is adapted to serve as a preliminary ignition chamber. The wide end of the shell has a rim which co-operates with a shoulder T' in the passage Q' for maintaining the passage space outside the shell out of communication with the principal cylinder space while the engine is cold.

In Fig. 4 the additional clearance space 2 is formed between a hollow, waisted body 3 and an enclosing cylindrical shell 5. The latter is formed with a seat 6 against which the body 3 normally bears so as to maintain the space 2 closed. Pipes 4 circulate cooling fluid through the body 3 so as to keep the latter cool, and the seat 6 will therefore, when the shell is expanded by the heat from the engine, be retracted from the body 3 and form a slit through which the space 2 can communicate with the principal cylinder space. The lower end 7 of the shell 3 is tapered to form a nozzle and is provided with apertures through which the fuel jet 8 is projected diametrically across the passage. Fuel will therefore be carried together with the air into the space 2, and the mixture, when expanded and ejected through the nozzle by the ensuing explosion, will tend to atomize the fuel still fed into the cylinder.

A further modification is shown in Fig. 5 wherein a shell 9, which forms the preliminary ignition chamber, is carried by a slightly V-shaped bridge piece 10 the ends of which are secured to the cylinder head by means of screws 11. The shell is normally maintained by the bridge piece against a seat 12, thereby blocking the access to a surrounding, additional clearance space 13. On the bridge piece being expanded by the heat from the engine, its V-shape will become more acute, and the shell 9 will be retracted from the seat 12 for setting the additional clearance space 13 in communication with the principal cylinder space.

Fig. 7 shows an arrangement wherein, in order to obtain a free communication between the additional clearance space and the principal cylinder space without employing an excessively long thermal element, the bearing surfaces are grooved and slotted. The shell 14, which forms a preliminary ignition chamber, is provided at its free end with a flange 15 by means of which it normally bears against a shoulder 16 in the enclosing casing. On the expansion of the shell the flange is retracted and forms a narrow slit through which communication is established between the additional clearance space 17 and the principal cylinder space. Flange and shoulder are provided respectively with annular grooves 18 and 19 which are relatively staggered. The groove 19 communicates through ducts 20 with the space 17, and the groove 18 communicates through ducts 21 in the flange 15 with the ignition chamber so that, on the bearing surfaces being separated, the fluid will find an easy passage through the ducts from and to the space 17.

Figs. 8 and 12 show the same arrangement for an engine in which the preliminary ignition chamber 22 receives the fuel from a jet directed across the cylinder space. The shell 23 is enclosed in a casing 24 between which and the shell the additional clearance space 25 is formed, the casing being closed by a cooled cover 26. The latter may be formed with an enlargement 27 arranged so as to project into the chamber 22 and form a diffusing baffle for the air from the space 25.

Figs. 9 to 11 show an arrangement in connection with a preliminary ignition chamber the object of which is to widen the in and outlet ducts $a$ of the chamber to the extent of a slit $b$ when the engine is cold, so that, in the cold condition of the engine, the compression in the principal cylinder space will be readily communicated to the ignition chamber. The ignition chamber is formed by a shell U which, as it expands when the engine heats up, closes the slit $b$. By this throttling of the passages the compression in the ignition chamber will be retarded, so that the ignition will take place under lower compression.

In Fig. 9 the passage which leads to the ducts $c$ through the slit $b$ is situated outside the shell U which forms the chamber. In Fig. 11 a similar slit $b'$ is controlled by a separate shell V which operates outside a shell U' arranged to receive the fuel jet.

In Fig. 11 a shell W which receives the fuel jet, controls by expansion a slit $b^2$ through which leads a very short passage $g$.

In all the constructions, whether or not any combustion takes place in the additional clearance space, a perfectly tight closure of the space with cold engine is unessential. An effective throttling of the fluid is all that is required.

I claim:

1. In an internal combustion engine the combination of an engine cylinder, a cylinder head formed with a recess defining an auxiliary combustion chamber, a shell member loosely secured within said recess and dividing said combustion chamber into a pre-combustion chamber and an additional clearance space communicating by a restricted passage formed by a clearance provided between the walls of the shell member and the walls of the recess, the shell member being designed and constructed to operate, by thermal expansion and contraction, to regulate and close said restricted passage to increase the compression pressure in said pre-combustion chamber when the engine is cold at starting and reduce the compression pressure in said pre-combustion chamber when the engine is operating at normal running temperature.

2. In an internal combustion engine, the combination of an engine cylinder, a cylinder head formed with a recess defining an auxiliary combustion chamber, a shell member loosely secured within said recess and dividing said combustion chamber into a pre-combustion chamber and an additional clearance space communicating by a restricted passage formed by a clearance provided between the walls of the shell member and the walls of the recess, the shell member being designed and constructed to operate by thermal expansion and contraction to maintain said restricted passage closed when the engine is cold and open when the engine is operating at normal running temperature.

3. The structure claimed in claim 2 in combination with a fuel injection nozzle arranged in position to direct the fuel jet through the shell member.

4. The structure claimed in claim 2 in combination with a fuel injection nozzle arranged in position to direct the fuel jet through the pre-combustion chamber.

5. In an internal combustion engine, the combination of an engine cylinder, a cylinder head formed with a recess defining an auxiliary combustion chamber, a shell member loosely secured within said recess and dividing said combustion chamber into a pre-combustion chamber and an additional clearance space communicating each with the other and both with the cylinder by a restricted passage formed by a clearance provided between the walls of the shell member and the walls of the recess, the shell member being designed and constructed to operate by thermal expansion and contraction to maintain the communicating passage open when the engine is cold and closed when the engine is operating at normal running temperature.

PROSPER L'ORANGE.